(No Model.)
L. CRULL.
UNITING TILES TO WALLS.
No. 417,233. Patented Dec. 17, 1889.
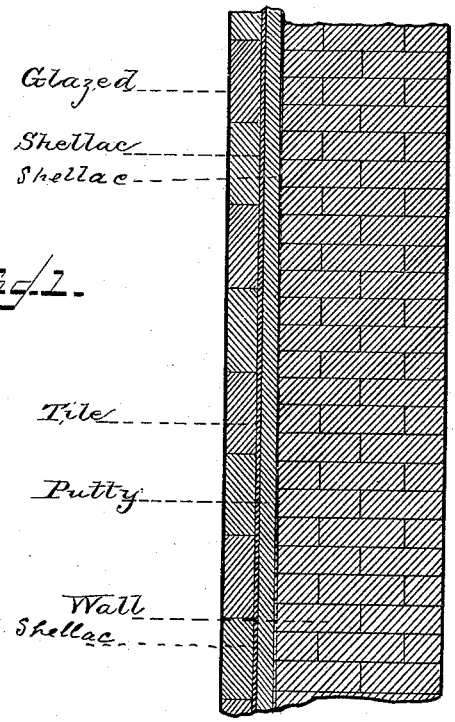
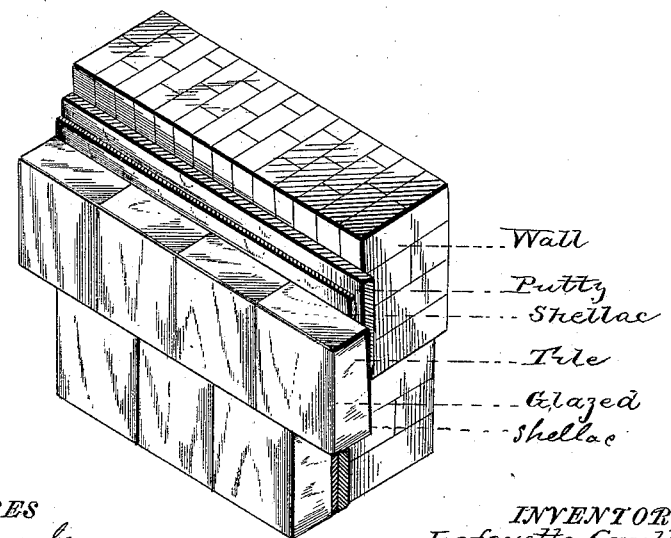
WITNESSES
F. L. Durand.
H. A. Smith.
INVENTOR
Lafayette Crull
Theophilus Weaver
*Attorney*

UNITED STATES PATENT OFFICE.

LAFAYETTE CRULL, OF HARRISBURG, PENNSYLVANIA.

UNITING TILES TO WALLS.

SPECIFICATION forming part of Letters Patent No. 417,233, dated December 17, 1889.

Application filed April 20, 1889. Serial No. 307,940. (No model.)

*To all whom it may concern:*

Be it known that I, LAFAYETTE CRULL, a citizen of the United States, residing at Harrisburg, in the county of Dauphin and State of Pennsylvania, have invented certain new and useful Improvements in Uniting Tiles to Walls for the Decoration and Beautifying of Dwelling-Houses and Business Places or Parts Thereof; and I do hereby declare that the following is a full, clear, and exact description of the invention, which will enable others skilled in the art to which it appertains to make and use the same, reference being had to the accompanying drawings, making a part of this specification, in which—

Figure 1 illustrates a cross-section of a wall having front surface coated with shellac and provided with a layer of cement or soft putty and having tiles adhered thereto, which tiles have their front side made glazed and their rear side or backs porous or unglazed, but coated with shellac, and thus sealed, so that the cement adheres thereto. Fig. 2 is a perspective of a portion of said wall, disclosing the coating of shellac, the layer of cement, and another coat of shellac on a wall-surface.

My tiles have their bodies and the surface next to the wall made porous or unglazed. Hitherto it was usual to soak such tiles in water before embedding or setting the same in place on excavated places or recesses of a wall-surface provided with a cement or course of plaster. If the tiles were not first soaked in water, they would not stick or adhere to the wall-surface, as the porous body of the tiles would absorb the oil or other admixture of the cement and would occasion deterioration of the cement, so that the tiles would not adhere to the wall. By coating the wall-surface and also the porous backs of the tiles with a coat of shellac and setting the tiles when dry on a layer of putty tempered in oil and varnish, the tiles, having their pores sealed with the coat of shellac, will not absorb the coherent part of the cement, and the wall-surface likewise insures the cement taking hold and sticking the prepared tiles in desired places without first soaking the tiles in water. The cement thus employed need be only soft putty or litharge with a percentage of white lead ground in oil or varnish. In finishing white walls the interstices may be filled with pure white lead and oil. When the tiles are glazed on both sides, whether having their backs plain or corrugated, soft putty will stick without courses of shellac on the tile-backs, it being requisite only that a gentle pressure by hand be used in making the tiles adhere, and the tendency is that the setting will improve with age and not deteriorate.

By my method or art described porous tiles can be readily attached to walls, floors, or ceilings prepared as described, whether of wood, plaster, brick, stone, or metal, without soaking the tiles in water or corrugating their backs or mutilating the wall-surfaces, and the interstices between the tiles are caused to fill level full with the cement by a gentle pressure of the hand, which interstices may also be filled by other plaster or cement, if desired, my present improvement having reference, as stated, to applying porous tiles without soaking in water to make them stick.

I claim—

The combination, with a wall-surface or floor or ceiling of wood or other material coated with shellac or hard oil, of tiles left unglazed on their backs, but coated with shellac, the prepared tile being directly applied to the prepared wall by a layer of cement of soft putty tempered with oil or varnish, substantially as set forth.

LAFAYETTE CRULL.

Witnesses:
D. C. MAURER,
H. S. REINHOLD.